United States Patent [19]
Apenberg et al.

[11] 3,942,003
[45] Mar. 2, 1976

[54] METHOD AND APPARATUS FOR THE IN SITU ANALYSIS OF MARINE ORE CONCRETIONS

[75] Inventors: Walter Apenberg, Karlsruhe; Georg Böhme, Leopoldshafen; Hans-Ulrich Fanger, Friedrichstal; Benno Glaser, Karlsruhe; Klaus Hain, Karlsruhe-Durlach; Jörg Hubener, Friedrichstal; Winfried Stegmaier, Leopoldshafen; Vaclav Prech, Leopoldshafen; Jaroslav Vagner, Leopoldshafen, all of Germany

[73] Assignee: Gesellschaft fur Kernforschung m.b.H., Karlsruhe, Germany

[22] Filed: Feb. 28, 1974

[21] Appl. No.: 446,898

[30] Foreign Application Priority Data
Feb. 28, 1973 Germany............................ 2309974

[52] U.S. Cl.................................. 250/255; 250/253
[51] Int. Cl.². ........................................... G01V 5/00
[58] Field of Search ............ 250/253, 255, 302, 303, 250/304

[56] References Cited
UNITED STATES PATENTS

| | | |
|---|---|---|
| 2,528,955 | 11/1950 | Hayward.......................... 250/255 X |
| 2,926,259 | 2/1960 | Dewan............................... 250/255 |
| 3,532,881 | 10/1970 | Dewan............................... 250/255 |
| 3,638,020 | 1/1972 | Duffey et al......................... 250/253 |

*Primary Examiner*—Archie R. Borchelt
*Attorney, Agent, or Firm*—Spencer & Kaye

[57] ABSTRACT

For the in situ analysis of marine ore concretions, ore samples are aspirated from the sea floor and introduced in a sample container aboard a carrier body travelling underwater along and in the vicinity of the sea floor. While in the sample container, the ore concretions are exposed to radioactive rays for inducing a secondary radiation emanating from the ore concretions. The secondary radiation is measured for determining the quantity of the individual elements contained in the ore concretions.

27 Claims, 6 Drawing Figures

METHOD AND APPARATUS FOR THE IN SITU ANALYSIS OF MARINE ORE CONCRETIONS

BACKGROUND OF THE INVENTION

The present invention relates to a method and apparatus for an in situ analysis of ore concretions which lie on the sea floor and which are raised therefrom for performing the analysis.

The great demand for nickel and copper makes necessary the mining of even those deposits that are accessible only with difficulty, such as manganese lumps embedded in the sea floor at a depth of from 3,000 to 6,000 m. A decision whether these lumps are worth mining depends upon the precise knowledge of their content of usable metals. Large investments required for the necessary conveying equipment make mining appear profitable only where the fields have a size of several 10,000 km$^2$. No method of analysis is known, however, which would permit verification of a sufficiently dense measuring grid on such sea floor surfaces with a justifiable expenditure of time.

In order to be able to make manganese lump analyses, for example, it is the practice to bring these manganese lumps from great depths (such as 6,000 m) and lift them on board ships by means of dredges. The time required to obtain a sample amounts to several hours, and further, the sample cannot be accurately associated with the sea floor coordinates. The lumps are then analyzed on board (and also in land-based laboratories) with wet chemical processes and by X-ray fluorescence methods, for which the samples must undergo extensive preparations.

Practically the only in situ analysis methods applicable are $\gamma$-spectroscopic processes. Because of the special requirements for an analysis in water at pressures of several hundred bars with corresponding heavy reinforcements of the instruments, high transparence must be assured for the inducing (primary) and the induced (secondary) radiation. A comparison of the transmission of gamma radiation in 10 cm water for 20 keV, 1 MeV, 10 MeV with the values $10^{-4}\%$, 50% and 80% in the same sequence shows that an X-ray fluorescence analysis must be excluded.

SUMMARY OF THE INVENTION

It is the object of the present invention to provide a method of analysis which can also be used at high pressures on or closely above the sea floor and apparatus usable under these conditions to perform the above-outlined analyses to assure that the needed information density can be realized with an acceptable expenditure of time for a measuring point distance of a few hundred meters.

This object and others to become apparent as the specification progresses, are accomplished by the invention, according to which, briefly stated, the ore concretions are irradiated with radioactive radiation and are excited to emit a secondary radiation which is characteristic of the elements of the ore concretions under examination and that this characteristic radiation is measured and the quantity of the individual elements is determined. The ore concretions may be hydraulically aspirated to the location where the analysis is performed. According to the present invention, the ore concretions may also be irradiated with neutrons and the gamma radiation induced by the neutrons may be measured. It is further possible, according to the present invention, to determine the bulk density of the ore concretions by means of determining the absorption of gamma radiation. Separation of the ore concretions from the undesirable substances can preferably be effected by utilizing the differing sinking or settling speeds in sea water of the components to be separated.

An apparatus according to the present invention for practicing the method includes a conveyor which travels on or closely above the sea floor and has a suction device and a suction line with suction opening. The apparatus further includes a system for separating the ore concretions from the undesirable substances, a sample container which receives the ore concretions and which serves as a measuring chamber, a radiation source which emits the radioactive radiation to excite the ore concretions in the sample container, and a radiation detector to receive the characteristic secondary radiation emanating from the ore concretions. The conveyor includes a suction generating device which may be a hydraulic pump for drawing the ore concretions through the suction conduit. The suction conduit has a suction opening which is guided over the sea floor at a fixed distance and operates as a suction nozzle. Preferably, the radiation source may be disposed in or laterally of the sample container and the shielded radiation detector with the collimator may be situated externally of the sample container. The shield of the radiation detector or an additional shield protects the radiation detector from radiation emitted directly from the radiation source.

A further embodiment of the apparatus of the present invention is characterized in that the bulk density is determined with the aid of the gamma radiation emitted by the radiation source and the radiation detector. Or, in the alternative, a further gamma radiation emitting source and a further radiation detector may be fastened outside the sample container. In this case, a neutron shield is provided at least around parts of the sample container and of the radiation source.

In one embodiment of the apparatus according to the present invention the pump is disposed upstream of the separating system which is formed as a horizontal diffusor disposed in the flow path of ore concretions. The sample container is disposed downstream of the diffusor. In a preferred manner, an additional line for sea water may be provided which opens into the bottom of the diffusor in the direction of the material flow. The sample container itself may be cylindrical, and may be provided with a slot-shaped opening along one generatrix. The sample container is rotatable about its longitudinal axis by means of a drive. According to the invention, a cryostat, a refrigeration machine, an electronic component, the sample container, the radiation sources and the shields may be accommodated in a floating hull structure which can be moved by means of a tow line. The suction line then protrudes from the floating body and is moved by means of a drag line, while the suction nozzle is guided between skids.

In a further embodiment of the apparatus according to the present invention, the pump is disposed downstream of the separating system and the separating system is constituted by the sample container and a suction line extending from the pump and opening into the sample container. In this embodiment, the sample container is preferably bow-shaped and has a bottom which can be swung open outwardly about an axis by means of a motor. The radiation source may be disposed on the bottom itself or inside the bowl or on the bowl wall. A preferred embodiment provides that the cryostat, the refrigeration machine, the electronic component, the sample container, the radiation sources and the shields are suspended in a sled frame which can be moved by means of a tow line and which slides on skids. At both sides of the suction opening of the suction or drag hose there are disposed guide wheels for guiding the drag hose itself between the skids of the sled.

DETAILED DESCRIPTION OF THE EMBODIMENTS

Figure 1:
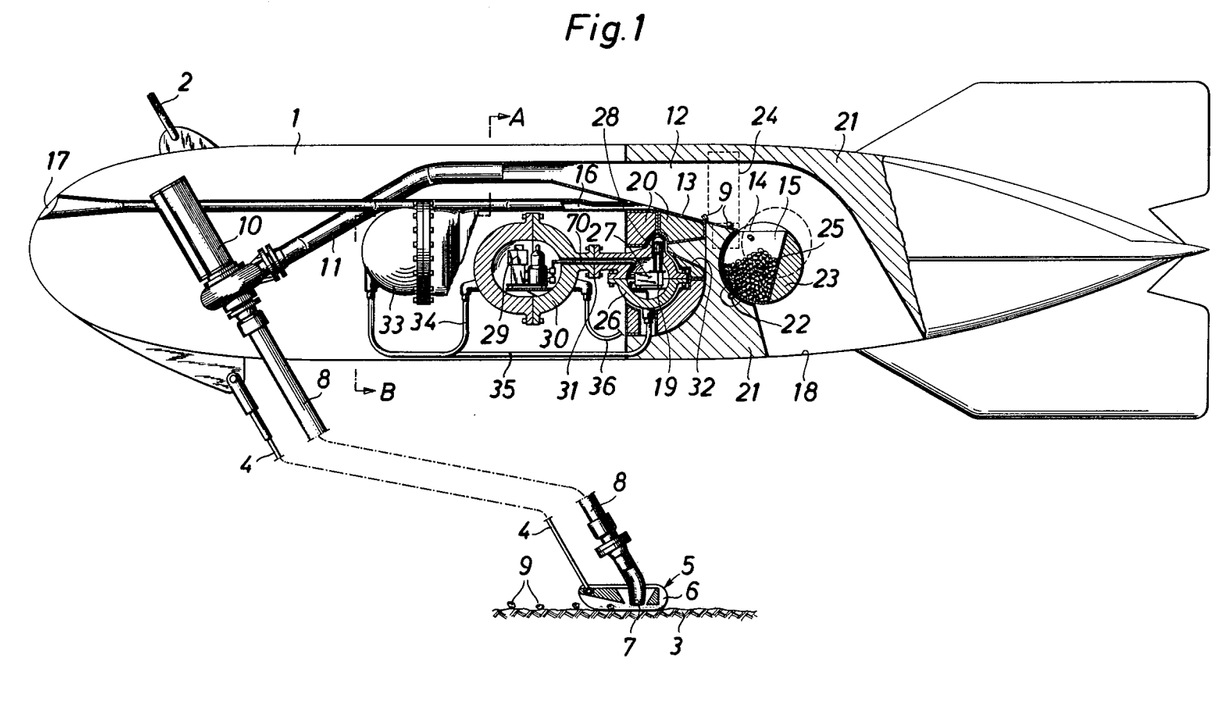
FIG. 1 is a schematic, fragmentary side elevational view, partially in section, of a first embodiment of the invention.

Turning now to FIG. 1, there is illustrated a carrier body constituted by a torpedo-shaped floating hull structure 1. It is moved at a distance over the sea floor by a ship through a tow line 2 which may simultaneously serve as the supply cable for parts inside the floating body 1. One end of a drag line 4 is secured to the lower portion of the floating hull body 1 to move a sled 5 including two parallel skids 6 (only one shown). The manganese lumps 9 disposed on the sea floor 3 are hydraulically aspirated into the suction opening 7 between the two skids 6 through a suction hose 8 fastened to the sled 5 or the lump pickup.

The suction hose 8 is connected with a pump 10 which is fastened inside the floating body 1 and hydraulically sucks in the manganese lumps 9. The pump 10 forwards the managanese lumps through a line 11 to a horizontal diffusor 12.

The diffusor 12 is funnel-shaped; its lower portion 13 ends at the opening 14 of a sample container 15 designed as a measuring vessel. The diffusor 12 serves to separate the manganese lumps 9 from undesirable substances such as mud, silt and the like. This separation is effected substantially by virtue of the different speeds at which the manganese lumps 9 and the undesirable substances sink. It is readily observable in FIG. 1 that the relatively heavier (faster sinking) ore concretions will settle in the sample container 15, while the relatively lighter, undesired particles will be carried in a greater arc and thus will avoid the container 15. In order to increase the efficiency of the diffusor 12, an additional line 16 opens into the diffusor bottom 13 and is oriented in the direction of the material flow in the diffusor 12. The line 16 leads to the front end of the floating body 1 and is provided there with an entrance opening 17 through which environmental sea water is introduced. At the height of the sample container 15, the diffusor 12 widens and at the lower portion of the floating body 1 it is again in communication with the sea through an exit opening 18. The undesirable substances as well as the manganese lumps 9, upon completion of the measurement, are ejected through the opening 18.

The diffusor 12, the sample container 15 as well as a detector assembly 19 with a shield 20 are embedded in a shield 21 of polyethylene, for example, which protects the environment against the neutrons emanating from a radiation source 22 or from the manganese lumps 9 inside the sample container 15.

The sample container 15 has a cylindrical shape and is provided with a slot-shaped opening 14 along its generatrix. A portion of the interior of the cylinder is filled with a shield 23 which screens the opening 18 from the interior of the sample container 15. The sample or measuring container 15 can be rotated about its axis 25 by means of an only symbolically shown drive 24. Thus, as the container opening is oriented downward in the direction of the discharge opening 18 as a result of the rotation of the container 15 about the axis 25, the manganese lumps 9 disposed therein can be ejected upon completion of the measurement.

The detector assembly 19 is disposed in a pressure-tight vessel 26 and comprises a cryostat 27 and a detector unit 28 which may be a germanium-lithium detector equipped with a preamplifier. The detector unit 28 is cooled in a closed-circuit cooling system which includes a compressor unit 29 accommodated in a pressure-tight vessel 30, a heat exchanger, an oil pump and others. The detector unit 28 is mounted to the cold terminus of a refrigerator forming part of the cooling unit. The cryostat 27 is connected with the compressor unit 29 through a line 70. The pressure-tight vessels 26 and 30 are connected together by a flange 31. The cooling of the detector 28 may be effected by the Gifford-McMahon process.

The vessel 26 itself is disposed inside the shield 20 which may be made of polyethylene or boron paraffin and which almost completely encloses the vessel 26. Only at the height of the detector 28 is the shield 20 provided with a collimator aperture 32 which is filled with moderating material 21 to protect the detector from fast neutrons. The opening of collimator 32 is oriented in the direction of the sample container 15 so that the radiation emanating from the manganese lumps 9 in the sample container 15 can be selected and picked up by the detector 28. The radiation source 22 which is preferably a californium-252 source, is disposed laterally of sample container 15 so that the radiation emanating therefrom, preferably the gamma radiation, cannot impinge directly on the detector 28 as it passes through the collimator 32. Direct radiation from source 22 would destroy the detector 28 within a very short time.

A further pressure-tight vessel 33 is disposed laterally of the pressure vessel 30 and contains devices for the electric power supply and for electronic data processing for the measured values obtained from the detector 28. In order to compensate for the resulting weight of the floating hull structure 1, large portions thereof must be filled with pressure-tight buoyant bodies (not shown). The container 33 for the electronic devices is connected with the pressure vessels 26 and 30 by means of respective supply cables 35 and 34, while the pressure vessels 26 and 30 are connected with each other by a supply cable 36.

In order to analyze the manganese lumps 9 within the measuring container 15 with respect to their content of usable metals, the contents of the container 15 are irradiated by the californium neutron source 22 and the spectrum of the resulting captured gamma radiation is recorded by means of detector 28 and evaluated by the electronic components (not shown) in the vessel 33.

The method of analysis is thus the prompt $(n,\gamma)$ analysis with high-energy primary transition lines above 4 MeV and possibly also the neutron activation analysis with a characteristic energy about 1 MeV. The thermal neutron activation analysis of some components of the lumps (e.g., copper, nickel, cobalt) will prove difficult in the presence of larger amounts of manganese since the Compton background produced by the Mn lines overlaps the rather weak lines made by copper, nickel or cobalt. The only Ni isotope, Ni-64, which can be used for the capture activation, is present in the element only at 1% and the product nucleus has a half-life of 2.5 hours, i.e., approximately the same as Mn-56. For copper the conditions are more favorable with 31% presence of the Cu-65 isotope and 5.1 min. half-life for the daughter nucleus Cu-66. A short-term activation of cobalt makes good sense only via the formation of the 10.5 min. isomer Co-60m, which, however, will decay with a detectable cascade into Ni-60 only with 0.25% probability.

When the manganese lumps are activated with the 1 mg californium source 22, sprectra are produced which, in addition to strong manganese and aluminum peaks exhibit only non-utilizable indications of cobalt and copper, but do not indicate even a trace of nickel. With a prompt $(n,\gamma)$ analysis of the manganese lumps 9, however, a measurement with a thermal neutron flux of $2 \times 10^7$ n/cm$^2$ and only 8g Mn lumps produces, in 22.5 hours, a spectrum having very good statistical qualities and energy resolution. The evaluation of the line intensities leads to the expectation of high accuracy in the determination of the concentrations. Thus the neutron source of californium-252 can be used in practice for performing the $(n,\gamma)$ method in an in situ process on the sea floor. 1 mg of Cf-252 emits $2.2 \times 10^9$ neutrons per second with an energy distribution which has a broad maximum at 2 MeV and $1.3 \times 10^{10}$ gamma quanta, of which 9% have energy values above 1.5 MeV. It is therefore necessary to thermalize the neutrons for capture in the sample material. For this purpose, the detector 28 or its capsule 26 is surrounded by the shield 21 or by the water itself which acts as a moderator material.

The analysis of the spectrum of the prompt gamma radiation emanating from the manganese lumps 9 in the measuring container 15 provides the relative concentrations of the usable metals and the manganese. With this measurement, it is possible, upon completion of the required calibration, to determine the quantities of manganese and usable metals with respect to the volume of the measuring container. The result, however, must be related to the mass of the lumps 9. This conversion may be effected by determining the bulk density in the measuring container 15.

Figure 2:
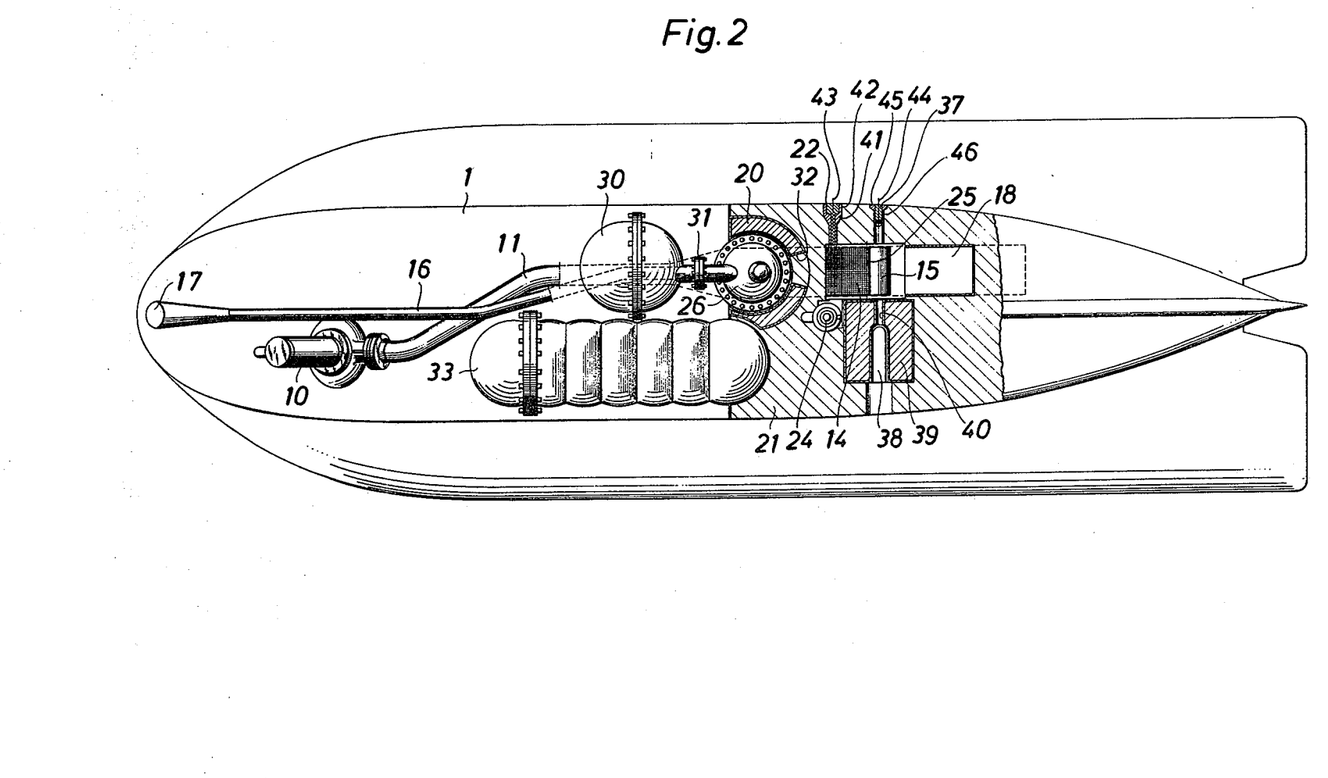
FIG. 2 is a schematic top plan view, partially in section, of the first embodiment.

By definition, the density is determined by a measurement of mass and volume. Neither measurements can be effected, however, by conventional means under the given conditions. Thus, a nuclear method is proposed for the determination of the density of the bulk of the manganese lumps within the measuring container 15. This method is based on the weakening of the gamma rays by the matter placed between the radiation source and a detector. As seen in FIG. 2, a further radiation source 37 is provided which is a gamma preparation with a source intensity in the order of magnitude of $5 \times 10^7$ s$^{-1}$. The source 37 must be planar or linear, with a diameter or length that is about 1.4 times the maximum lump diameter. A further detector 38 which is also accommodated in a shield 39 has a collimator slit 40 in the direction of the measuring container 15 and may be a sodium iodide crystal of the same size. The pulse rate measured with the detector 38 (and with the aid of the electronic instruments contained in electronic component container 33) furnishes an indication of the bulk density of the manganese lumps 9. The density of water at 1000 atmospheres and about 0°C is greater by about 4% than it is at 1 atmosphere.

Referring once more to FIG. 2, there are illustrated the floating body 1 in a sectional view and the side-by-side arrangement of the electronic component container 33, the pressure vessel 30 for the refrigerator compressor 29, the flange connection 31, the pressure vessel 26 for the detector assembly 19 and the lead shield 20 with the collimator slit 32. In front of the collimator slit 32, which is filled with the shield 21, lies the measuring container 15 with its opening slot 14. The drive 24 is disposed perpendicular to the plane of the drawing. The neutron source 22 which is contained in a pressure-tight sheath 41 within a bore 42 in the shield 21, or its axis 43, respectively, lies parallel to the axis 25 of the container. Axis 44 in which the further radiation source 37 and the detector 38 for the bulk density measurements are disposed is also parallel to the axis 25. The gamma source 37 is disposed in a sheath 45 which is inserted into a bore 46 in the shield 21. Under certain circumstances it is possible to dispense with the separate measurement of the bulk density of the manganese lumps 9 inside measuring container 15 by means of the radiation source 37 and the radiation detector 38 if the measurement is made with the gamma rays emitted by the radiation source 22. In this case, however, the radiation source 22 has to be arranged in such a manner that the measuring container 15 with its charge of manganese lumps lies between the radiation source 22 and the collimator 32 or the detector 28 (see FIG. 1).

Figure 3:
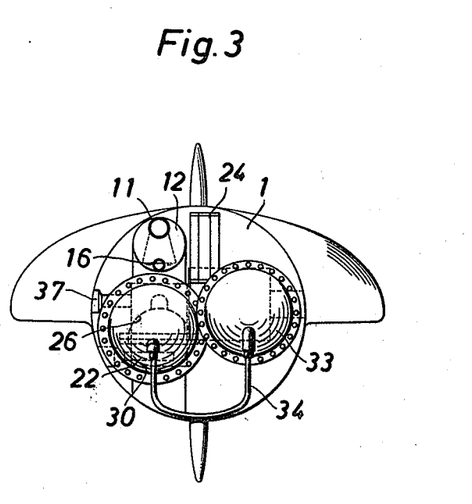
FIG. 3 is a section along line A-B of FIG. 1.

Turning now to the cross-sectional FIG. 3, there is illustrated in particular the position of the pressure vessel 30 for the refrigerator compressor 29 next to the electronic component container 33 with the connecting transverse line 34. The drive 24 for the measuring container is disposed above the electronic component container 33, and the diffusor 12 with its conveyor tube 11 and the additional tube 16 are disposed above the pressure vessel 30.

Figure 4:
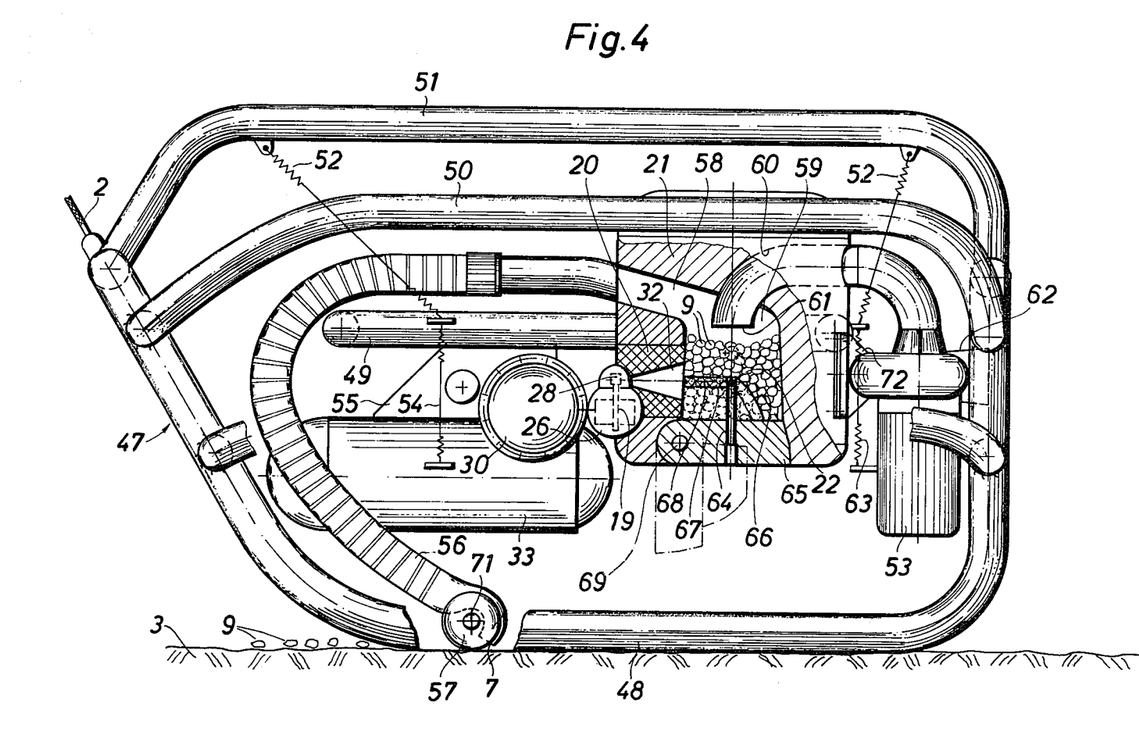
FIG. 4 is a schematic side elevational view, partially in section, of a second embodiment of the invention.
Figure 5:
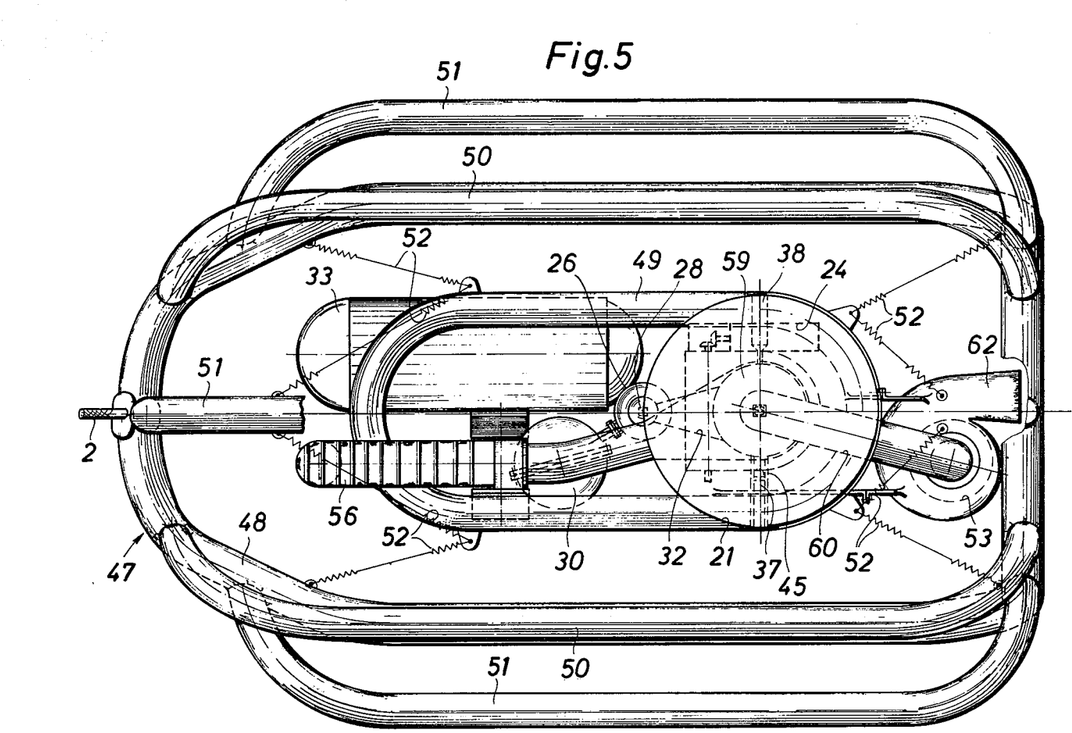
FIG. 5 is a schematic top plan view, partially in section, of the second embodiment.
Figure 6:
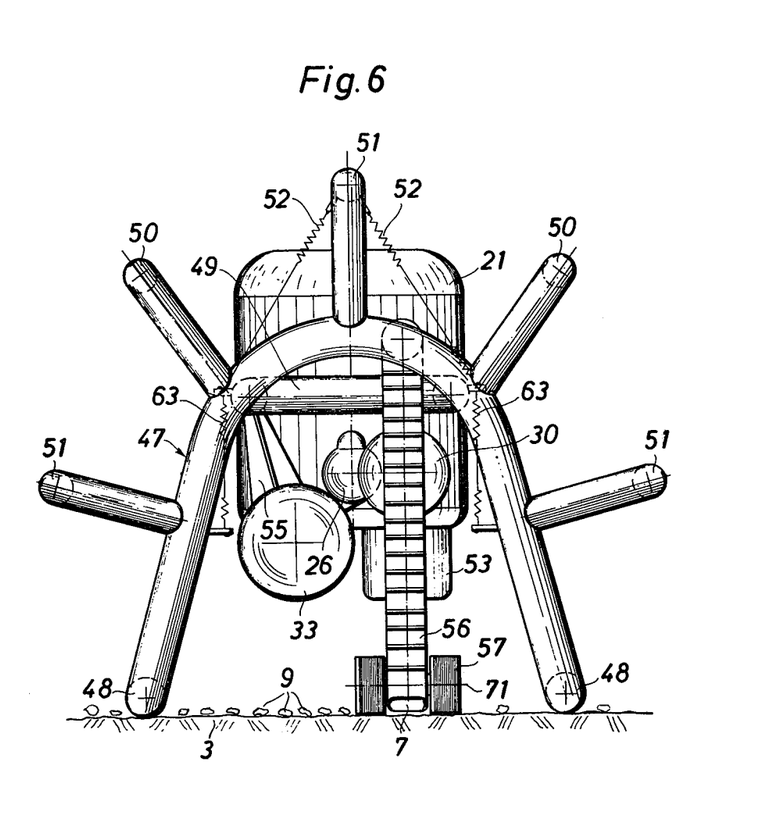
FIG. 6 is a schematic front elevational view of the second embodiment.

FIGS. 4 to 6 show another embodiment in which the density of the manganese lumps 9 or the spectra of the prompt $(n,\gamma)$ events can be measured in the same manner and with the same instruments as in the first embodiment. Thus, the reference numerals for corresponding parts are the same as in FIGS. 1 through 3. This applies for the electronic component container 33, the pressure vessel 30 for the coolant compressor unit 29, the pressure vessel 26 for the detector 28, its cryostat 19, the lead shield 20 with the collimator slit 32 and the neutron shielding 21 which, in this embodiment, has cylindrical shape. The entire measuring apparatus and the suction device for the manganese lumps 9 on the sea floor 3 are mounted on a carrier body which, in this embodiment, is constituted by a sled frame 47. The latter is formed of individual rods and has skids 48 (see also FIG. 5) or chains as well as a supporting and stabilizing rack 49, 51. The supporting rack 49 is suspended from the stabilizing rack 51 as well as from the skids 48 by means of spring devices 52 and is thus substantially insensitive to shocks. The individual components, such as the electronic component container 33, the pressure vessel 30, the shield 21 and the pump 53 are fastened to the supporting rack 49. The fastening may also be effected by the interposition of springs 54 or spacers 55. The sled is moved, similarly to the previously described embodiment, by a tow line 2 which is attached to a surface ship and which simultaneously serves as a supply line (not shown in detail) for the individual electrical or electronic devices of the apparatus.

The suction pipe 56, designed as a drag hose, is fastened to the shield 21 which may be made of polyethylene or boron paraffin disposed in a metal cylinder. The suction line 56 extends downward to a small distance from the sea floor 3 between the two skids 48 of the sled 47. The intake opening 7 is guided at a small distance over the floor 3. This is effected by means of two wheels 57 which are fastened to an axle 71 at the drag hose 56. The drag hose 56 itself is connected with a bore 58 extending inside the shield 21 and widening toward the sample container 59. The sample container 59 or the sample chamber, as the case may be, is situated at the height of the collimator 32.

The manganese lumps 9 to be collected in the sample chamber 59 are aspirated from the sea floor 3 by means of the pump 53 which is in communication with the sample container 59 through a suction tube 60. The inlet opening 61 of the conduit 60 is disposed inside the sample container 59 in such a manner that the manganese lumps 9 which are sucked in from the surface of the sea floor 3, are filled into the sample container 59 only to a certain level. Once the predetermined charging level is exceeded, the vacuum in the conduit 60 draws away excess manganese lumps 9 and ejects them through the ejection line 62. Undesirable mud and the like, sucked in through the suction line 56 are also ejected through the ejection line 62. It is thus seen that the suction tube 60, the opening of which is situated in the upper part of the sample container 59, functions as a separator, since it carries away the lighter, undesired material directly as it is admitted to the sample container 59 from the passage 58.

The charge height of the manganese lumps 9 within the sample chamber 59 is determined, for example, by a measurement of the gamma radiation absorption with a gamma source 37 and a diametrally opposed detector 40. These two components correspond to the gamma source and the detector of embodiment 1. When the charge level within the sample chamber 59 reaches the height of the gamma source 37, the signal received by the oppositely disposed detector 40 (see FIG. 5) is weakened. Upon this occurrence, the pump 53 is switched off. It is noted that such a level control may also be effected with regard to the pump 10 and the measuring container 15 of the previously described embodiment.

Pump 53 is fastened to the shield 21 by a flange 72 and can additionally be supported by springs 63 to provide a shock-free suspension.

The measurement of the proportions of usable metals and manganese in the manganese lumps 9 in the sample container 59 corresponds to that described in the preceding embodiment and is thus effected by means of the $(n,\gamma)$ analysis. For this purpose, again, the californium-252 source 22 is disposed in the vicinity of the manganese lumps 9 or the sample container 59, and may be held within the shield 21. In this embodiment, however, the californium-252 source 22 is disposed in a horizontally oriented tube 64 which is fastened at the bottom 65 of the sample container 59 and which is accessible from the outside. A bar 66 which protrudes into the interior of chamber 59 is disposed at the bottom 65 and carries, on its upper edge 67, an additional shield 68 made, for example, of lead. The additional shield 68 prevents neutrons or gamma radiation from the source 22 from impinging directly on the collimator 32 and thus on the detector 28. The shield 68 is therefore disposed between the source 22 and the collimator slit 32 on the connecting line between the detector 28 and the source 22.

The bottom 65 of the sample chamber 59 can be pivoted downwardly about an axis 69 by means of the motor 24 (see FIG. 5). The bottom 65 is opened after each measurement and permits removal of the manganese lumps 9 or the charge from the sample chamber 59. After emptying and locking the sample chamber 59, a new batch of ore concretions may be subsequently measured. For this purpose, the pump 53 is again energized.

FIG. 5 is a top plan view of the sled 47 illustrating the position of the components of the measuring device. In particular, FIG. 5 shows the suspension of the individual components, for example, the shield 21, the pump 53, the electronic component container 33, the pressure vessel 30 for the compressor (corresponding to the compressor 29 of FIG. 1), the pressure vessel 26 for the cryostat and the detector 28 as well as the suction hose 56.

FIG. 6 illustrates the position of the individual components secured to the sled 47 in a front view illustration. The two skids 48 slide on the sea floor 3 and guide the drag hose 56 with its suction opening 7 at a constant distance above the floor 3. In order to ensure that the suction opening 7 also maintains a constant distance from the floor 3, the wheels 57 are arranged at opposite sides of the drag hose 56 on an axle 71. The arrangement of the individual heavy elements, as for example, the shield 21, the pressure vessels 26, 30 and 33 as well as the pump 53 are balanced, i.e., the pressure on the two skids 48 is approximately the same. The individual spring suspensions 52 and 63 act as shock absorbers. By way of example, the following models may be used for the detector and signal evaluating devices incorporated in the apparatus according to the invention: The detector device 19 with the radiation detector unit 28 is a Ge(Li)-detector with a volume of 14 cm$^3$ (Lasco), and the detector 38, 40 is a NaJ(Tl)-detector (Quartz and Silice) with a photomultiplier Model 276 (Ortec). The electronic components accommodated in the pressure-tight vessel 33 are a preamplifier Model PSC 44 (Schlumberger SAIP), a main amplifier Model 450 (Ortec) and a power amplifier Model 1467 (Canberra Industries), a ADC 13 bit Model 8215 (Montedel div. Laben), and a memory 4 k × 16 bit Model FI 75 (Valvo) for the detector device 19, 28, and a main amplifier Model 814 (Canberra Industries), a ADC 16 bit (Analog devices), and a memory 256 × 12 bit Model RAM 332 D (Electronic Memories) for the detector 38, 40.

It will be understood that the above description of the present invention is susceptible to various modifications, changes and adaptations, and the same are intended to be comprehended within the meaning and range of equivalents of the appended claims.

We claim:

1. A method for the in situ analysis of ore concretions on the sea floor, comprising the following steps:
   a. guiding a means defining a suction opening along and immediately above the sea floor at a predetermined, constant height thereabove;
   b. hydraulically aspirating the ore concretions off the sea floor through said suction opening by entraining the concretions in a water stream;
   c. separating undesirable substances from the ore concretions by entraining the aspirated material along a substantially horizontal path by said water stream for causing material having a relatively high sinking speed to be introduced by gravity into an upwardly open sample container positioned laterally below the horizontal path and for causing material having a relatively low sinking speed to travel past the sample container;
   d. irradiating the ore concretions in the sample container with neutron radiation for inducing therein a secondary radiation characterizing the elements contained in the ore concretions;
   e. measuring said secondary radiation;
   f. determining the quantity of the individual elements contained in the ore concretions; and
   g. determining the bulk density of ore concretions in the sample container by gamma ray absorption.

2. An apparatus for the in situ analysis of concretions on the sea floor, comprising in combination:
   a. a carrier body;
   b. means for guiding said carrier body closely above the sea floor;
   c. aspirating means for picking up said ore concretions off the sea floor, said aspirating means including a suction-generating device aboard said carrier body, a suction hose attached to said carrier body and communicating with said suction-generating device, and means defining a suction opening in said suction hose;
   d. supporting means connected to said suction hose in the zone of said suction opening for guiding and maintaining said suction opening immediately above the sea floor at a predetermined, constant distance therefrom;
   e. separating means aboard said carrier body for separating undesirable substances from the ore concretions, said separating means communicating with said suction hose;
   f. a sample container, constituting a measuring chamber, aboard said carrier body and communicating with said separating means, said sample container receiving the ore concretions from said separating means;
   g. a radiation source aboard said carrier body for emitting a radioactive radiation directed on the ore concretions in said sample container; and
   h. a radiation detector aboard said carrier body for receiving secondary radiation emitted by the ore concretions.

3. An apparatus as defined in claim 2, wherein said suction hose is designed as a drag hose; further comprising a hydraulic pump constituting said suction-generating device; and a suction nozzle constituting said means defining said suction opening.

4. An apparatus as defined in claim 2, wherein said suction-generating device is disposed upstream of said separating means with respect to the direction of flow of the ore concretions through said suction hose toward said sample container.

5. An apparatus as defined in claim 2, wherein said suction-generating device is disposed downstream of said separating means with respect to the direction of flow of the ore concretions through said suction hose toward said sample container.

6. An apparatus as defined in claim 2, comprising an additional radioactive radiation source and an additional radiation detector both situated at diametrically opposite location externally of said sample container at a predetermined height thereof for emitting a signal when the concretions in said sample container attain said predetermined height.

7. An apparatus as defined in claim 2, wherein said sample container includes means defining an opening therein; the combination further comprising means for moving said sample container into a first position in which said opening is oriented upwardly for receiving the ore concretions from said separating means and for moving said sample container into a second position in which said opening is oriented downwardly for removing the ore concretions from said sample container by gravity.

8. An apparatus as defined in claim 7, further comprising means for supporting said sample container to be pivotal about a substantially horizontal axis of rotation; said means for moving said sample container includes drive means for rotating said sample container about said axis of rotation; said sample container having a cylindrical shape and a substantially horizontally oriented cylinder axis; said opening having a slot shape and extending along a generatrix of said cylinder.

9. An apparatus as defined in claim 2, wherein said separating means is constituted by a horizontal diffusor connected in the flow path of the ore concretions advanced toward said sample container, said sample container adjoining said diffusor downstream of, and laterally below said diffusor with respect to the direction of flow of the ore concretions.

10. An apparatus as defined in claim 9, wherein said suction-generating device is in communication with said diffusor for driving the aspirated material and a water stream from said suction hose through said diffusor.

11. An apparatus as defined in claim 9, including a bottom forming part of said diffusor and an additional line merging into said diffusor through said bottom and oriented in the direction of the flow of the ore concretions, said additional line including inlet means for receiving environmental sea water for introduction into said diffusor.

12. An apparatus as defined in claim 5, including a suction tube having one end connected to said suction-generating device and another end situated in an upper portion of said sample container, said suction-generating device and said suction tube constituting said separating means.

13. An apparatus as defined in claim 2, wherein said radiation detector is disposed externally of said sample container; further comprising a radiation shield aboard said carrier body, said shield containing said radiation detector; and a collimator connected to said radiation detector.

14. An apparatus as defined in claim 13, wherein part of said shield is disposed between said radiation source and said radiation detector to prevent radiation from entering said radiation detector directly from said radiation source.

15. An apparatus as defined in claim 2, wherein said sample container has a bottom; said radiation source being secured to said bottom; further comprising an additional shield secured to said bottom.

16. An apparatus as defined in claim 15, further comprising a horizontally oriented tube situated in said sample container and secured to said bottom, said horizontally oriented tube being accessible from the outside of said sample container through said bottom; said radiation source and said additional shield being disposed in said horizontally oriented tube.

17. An apparatus as defined in claim 2, further including means for determining the bulk density of the ore concretions in said sample container by said radiation detector and the gamma radiation emitted by said radiation source.

18. An apparatus as defined in claim 2, further comprising, for determining the bulk density of the ore concretions in said sample container, an additional radiation source emitting gamma radiation and accommodated in said carrier body externally of said sample container; and an additional radiation detector accommodated in said carrier body externally of said sample container.

19. An apparatus as defined in claim 2, including a shield disposed between said radiation source and said radiation detector to prevent radiation from entering said radiation detector directly from said radiation source.

20. An apparatus as defined in claim 2, including a neutron shield positioned about at least parts of said sample container and said radiation source.

21. An apparatus as defined in claim 2, further comprising first, second and third pressure-tight vessels accommodated in said carrier body; a cryostat containing said radiation detector and disposed in said first pressure-tight vessel; a compressor unit disposed in said second pressure-tight vessel and connected to said cryostat; an electronic component connected to said radiation detector and disposed in said third pressure-tight vessel.

22. An apparatus as defined in claim 2, further comprising a tow line attached to said carrier body; said carrier body being constituted by a floating hull structure.

23. An apparatus as defined in claim 2, wherein said carrier body is constituted by a sled structure including skids for running on the sea floor and a tow line attached to said sled structure.

24. An apparatus as defined in claim 22, wherein said suction hose extends from said floating hull structure toward the sea floor; said supporting means comprising a sled to which said means defining said suction opening is secured; skids affixed to said sled on opposite sides of said suction opening for guiding the latter closely above the sea floor; and an additional tow line attached to said sled and said floating hull structure.

25. An apparatus as defined in claim 23, said supporting means including wheels secured to said suction hose on opposite sides of said suction opening, said wheels being arranged for running on the sea floor to guide said suction opening closely above the sea floor and between said skids of said sled structure.

26. An apparatus as defined in claim 21, further including means connecting said compressor unit with said cryostat for providing a closed-circuit cooling of said radiation detector.

27. An apparatus as defined in claim 23, wherein at least some of the components defined in (c) and (e) to (h) are resiliently suspended from said sled structure by spring means.

* * * * *

UNITED STATES PATENT OFFICE
CERTIFICATE OF CORRECTION

PATENT NO. : 3,942,003
DATED : March 2nd, 1976
INVENTOR(S) : Walter Apenberg et al It is certified that error appears in the above-identified patent and that said Letters Patent are hereby corrected as shown below:

In the heading of the patent, under [75] Inventors: change "Hubener" to --Hübener--; under [73] Assignee: change "fur" to --für--.

Column 2, line 67, change "bow-shaped" to --bowl-shaped--.

Signed and Sealed this

Sixth Day of July 1976

[SEAL]

Attest:

RUTH C. MASON
*Attesting Officer*

C. MARSHALL DANN
*Commissioner of Patents and Trademarks*